United States Patent
Wu et al.

(10) Patent No.: US 9,860,347 B2
(45) Date of Patent: Jan. 2, 2018

(54) DATA TRANSFER METHOD AND APPARATUS

(71) Applicant: EMC Corporation, Hopkinton, MA (US)

(72) Inventors: Yang Wu, Beijing (CN); Wenliang Zhang, Beijing (CN); Songhai Yu, Beijing (CN); Yingchao Zhou, Beijing (CN); Jingjuan Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 14/310,465

(22) Filed: Jun. 20, 2014

(65) Prior Publication Data
US 2014/0379859 A1   Dec. 25, 2014

(30) Foreign Application Priority Data
Jun. 21, 2013 (CN) .......................... 2013 1 0272835

(51) Int. Cl.
*G06F 15/16* (2006.01)
*H04L 29/06* (2006.01)

(52) U.S. Cl.
CPC ................... *H04L 69/14* (2013.01)

(58) Field of Classification Search
CPC ..................................... H04L 69/14
USPC ....................................... 709/217
See application file for complete search history.

(56) References Cited

U.S. PATENT DOCUMENTS

| | | | | |
|---|---|---|---|---|
| 8,667,145 | B2* | 3/2014 | Bowler | H04L 63/0236 709/219 |
| 2002/0144048 | A1* | 10/2002 | Bolt | G06F 3/061 711/4 |
| 2004/0210775 | A1* | 10/2004 | Gbadegesin | H04L 29/06 726/13 |
| 2006/0206747 | A1* | 9/2006 | Nakano | G06F 11/1464 714/4.1 |
| 2007/0162912 | A1* | 7/2007 | Kilian | G06F 9/5061 719/313 |
| 2007/0204123 | A1* | 8/2007 | Saliba | G11B 33/125 711/165 |
| 2008/0059745 | A1* | 3/2008 | Tsukada | G06F 3/0607 711/165 |
| 2012/0079220 | A1* | 3/2012 | Cherian | G06F 11/1458 711/162 |
| 2012/0290750 | A1* | 11/2012 | Kawaguchi | G06F 11/2005 710/74 |

(Continued)

*Primary Examiner* — Richard G Keehn
(74) *Attorney, Agent, or Firm* — Konrad R. Lee; Krishnendu Gupta

(57) ABSTRACT

Embodiments of the present disclosure provide a data transfer method and apparatus by establishing, at a source device, a plurality of data connections with a target device in response to a data connection establishment request from a client, the data connection establishment request carrying information on a plurality of receiving ports that have been enabled by the target device; and transferring data from the source device to the target device via the plurality of data connections, and data transfer/receiving method and apparatus according to the embodiments of the present disclosure leverage a plurality of parallel data connections from a source device to a target device to transfer data, thereby enhancing the speed and reliability of data backup or restoration.

10 Claims, 4 Drawing Sheets

(56) References Cited

U.S. PATENT DOCUMENTS

| | | | |
|---|---|---|---|
| 2013/0114402 A1* | 5/2013 | Ould-Brahim | H04L 43/0811 370/225 |
| 2014/0122656 A1* | 5/2014 | Baldwin | H04L 65/4084 709/219 |

* cited by examiner

DATA TRANSFER METHOD AND APPARATUS

RELATED APPLICATION

This Application claims priority from Chinese Patent Application Serial No. CN 201310272835.8 filed on Jun. 21, 2013 entitled "Data Transfer Method and Apparatus," the content and teachings of which are hereby incorporated by reference in their entirety.

FIELD OF THE INVENTION

Embodiments of the present disclosure relate to the field of data backup, and more particularly, to a method and apparatus for transferring and/or receiving data by using a plurality of parallel data connections.

BACKGROUND OF THE INVENTION

Big data refers to datasets that are large and complex in scale, and the size of big data may be relatively large in the order of PB (petabyte), EB (exabyte) or ZB (zettabyte). Therefore, backup of big data can be a time consuming operation, and the time for backup of big data is found to have a linear relationship with the size of big data. For example, if the backup speed is 20 MBs (megabytes) per second, a backup of a file system of 12 TBs (terabytes) will take at least up to 7 days to complete.

Typically for enterprise-level customers, the customers follow in most cases a backup policy of performing a full backup over the weekend, and performing incremental backups every work-day. If the backup of the enterprise data cannot be finished in this fixed backup window, it may have a serious impact on the enterprise's business or operations. In addition, when the data is lost or destroyed, customers have to restore data from the storage locations of the backup data. Similar to backup of big data, restoration of big data is also a time consuming operation. However, once the customers have to restore the data, they always desire to restore data at the earliest possible instance.

SUMMARY OF THE INVENTION

To effectively alleviate or solve at least some of the above-described technical problems, there is a need to provide a method and apparatus that can quickly complete the data backup/restoration, wherein the embodiments of the present disclosure provide am efficient method for data receiving and/or data transfer.

According to a first aspect of embodiments of the present disclosure, there is provided a data transfer method and apparatus, which includes establishing, at a source device, a plurality of data connections with a target device in response to a data connection establishment request from a client, the data connection establishment request carrying information on a plurality of receiving ports that have been enabled by the target device; and transferring data from the source device to the target device via the plurality of data connections.

In an exemplary embodiment, one of the source device and the target device may comprise a network-attached storage device, and the other may comprise a backup device, and both the network-attached storage device and the backup device may be configured to support Network Data Management Protocol (NDMP), and may be implemented using NDMP.

In an exemplary embodiment, a number of the plurality of data connections may be carried in the data connection establishment request, and each of the plurality of data connections may comprise a connection, preferably a TCP connection.

In an exemplary embodiment, the information on the plurality of receiving ports may comprise an IP address and a port number for each of the plurality of receiving ports.

According to a second aspect of embodiments of the present disclosure, there is provided a data receiving method and apparatus, which include enabling, at a target device, a plurality of receiving ports in response to a data transfer request from a client; providing the client with information on the plurality of receiving ports, so that the client can send to a source device a data connection establishment request so as to instruct the source device to establish a plurality of data connections with the target device based on the information on the plurality of receiving ports; and receiving, at the target device, data from the source device via the plurality of data connections.

In an exemplary embodiment, one of the source device and the target device may comprise a network-attached storage (NAS) device, and the other may comprise a backup device, both the network-attached storage device and the backup device may be configured to support Network Data Management Protocol (NDMP), and may be further implemented using NDMP.

In an exemplary embodiment, the data transfer request may carry a number of the plurality of receiving ports, and the information on the plurality of receiving ports may comprise an IP address and a port number for each of the plurality of receiving ports.

According to a third aspect of embodiments of the present disclosure, there is provided a data transfer method and apparatus, which includes sending a data transfer request to a target device; obtaining information on a plurality of receiving ports which are enabled by the target device in response to the data transfer request; and sending to a source device a data connection establishment request carrying the information on the plurality of receiving ports, to instruct the source device to establish a plurality of data connections with the target device so as to transfer data from the source device to the target device via the plurality of data connections.

In an exemplary embodiment, one of the source device and the target device may comprise a network-attached storage (NAS) device, and the other may comprise a backup device, both the network-attached storage device and the backup device may be configured to support Network Data Management Protocol (NDMP) and implemented using NDMP.

In an exemplary embodiment, the data transfer request may carry a number of the plurality of receiving ports.

In an exemplary embodiment, the data connection establishment request may carry a number of the plurality of data connections, each of the plurality of data connections may comprise a connection, preferably a TCP connection and the information on the plurality of receiving ports may comprise an IP address and a port number for each of the plurality of receiving ports.

The data transfer/receiving method and apparatus according to the embodiments of the present disclosure leverage a plurality of parallel data connections from a source device to a target device to transfer data, thereby enhancing the speed and reliability of data backup or restoration.

BRIEF DESCRIPTION OF THE DRAWINGS

Through the detailed description of some embodiments of the present disclosure in the accompanying drawings, the above and other objects, features and advantages of the present disclosure will become more apparent, wherein the same reference generally refers to the same components in the embodiments of the present disclosure. In the accompanying drawings.

DETAILED DESCRIPTION OF EMBODIMENTS

Aspects of the present disclosure are described below with reference to flowcharts and/or block diagrams of methods, apparatus (systems) and computer program products in accordance with the exemplary embodiments. It will be understood that each block of the flowcharts and/or block diagrams, and combinations of blocks in the flowcharts and/or block diagrams, can be implemented by computer program instructions, and it should be obvious to one skilled in the art that the order in which they occur as shown in the exemplary figures may change, with the final result being obtained as desired by the disclosure. These computer program instructions may be provided to a processor of a general purpose computer, special purpose computer, or other programmable data processing apparatus to produce a machine, such that the instructions, which are executed by the processor of the computer or other programmable data processing apparatus, create means for implementing the functions/operations specified in the block or blocks of the flowchart and/or block diagram.

These computer program instructions may also be stored in a computer readable medium that can direct a computer or other programmable data processing apparatus to function in a particular manner, such that the instructions stored in the computer readable medium produce an article of manufacture including instructions which implement the functions/operations specified in the block or blocks of the flowchart and/or block diagram.

The computer program instructions may also be loaded onto a computer, other programmable data processing apparatus, or other devices to cause a series of operational steps to be performed on the computer, other programmable apparatus or other devices to produce a computer implemented process, such that the instructions which are executed on the computer or other programmable apparatus provide processes for implementing the functions/operations specified in the block or blocks of the flowchart and/or block diagram.

Figure 1:
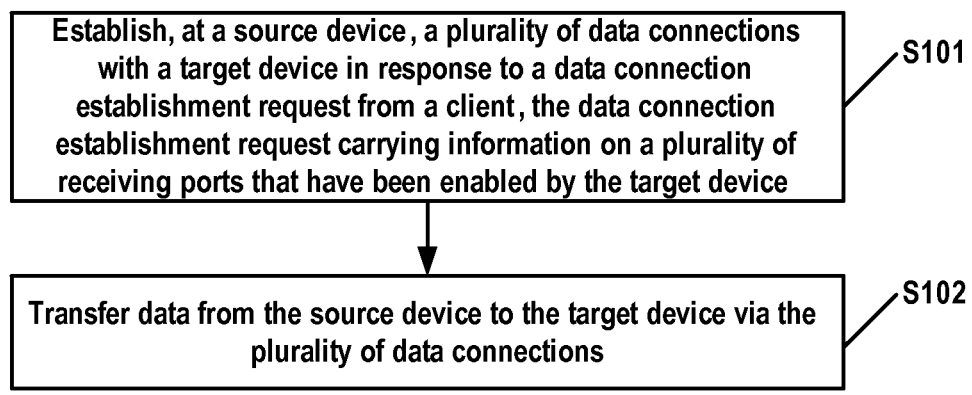
FIG. 1 schematically shows an exemplary flowchart of a data transfer method according to a first aspect of embodiments of the present disclosure.

According to an embodiment of the present disclosure, there is provided a data transfer method as illustrated in an exemplary flowchart of FIG. 1. First, at step S101, in response to a data connection establishment request from a client, a plurality of data connections with a target device are established at a source device. The data connection establishment request carries information on a plurality of receiving ports that have been enabled by the target device. In an embodiment of the present disclosure, the information on the plurality of receiving ports that have been enabled by the target device comprises an IP address and a port number for each of the plurality of receiving ports, and each of the plurality of data connections comprises at least a connection, for example a TCP connection. In an embodiment of the present disclosure, the data connection establishment request from the client carries a number of data connections that are desired to be established. The source device may establish a proper number of data connections based on its own network conditions and with reference to the number of data connections that the client desires to establish. After establishing the plurality of data connections with the target device, data is transferred to the target device from the source device via the plurality of data connections, as shown at step S102.

In the data transfer method as shown in FIG. 1, one of the source device and the target device may comprise a network-attached storage (NAS) device, and the other of the source device and the target device may comprise a backup device. For example, where data is backed up from the source device to the target device by using the data transfer method as shown in FIG. 1, the source device comprises a NAS device and the target device comprises a backup device; whereas data is restored from the source device to the target device, the source device comprises a backup device and the target device comprises a NAS device. NAS is a mechanism for implementing data storage by using a special device (called NAS device) that can be directly connected with a network medium. Since all these devices are generally assigned with respective IP address, a client may access these devices via a server that acts as a data gateway.

It is understood that the data transfer method as shown in FIG. 1 may be implemented by the source device, so that data may be backed up and restored from the source device to the target device. In an embodiment, the method is implemented based on Network Data Management Protocol (NDMP). In the context of NDMP, considering a scenario where data is backed up from a source device to a target device by using the data transfer method as shown in FIG. 1, the source device is configured as a data server supporting NDMP; and in a scenario where data is restored from a source device to a target device by using the data transfer method as shown in FIG. 1, the source device is configured as a tape server supporting NDMP.

Figure 2:
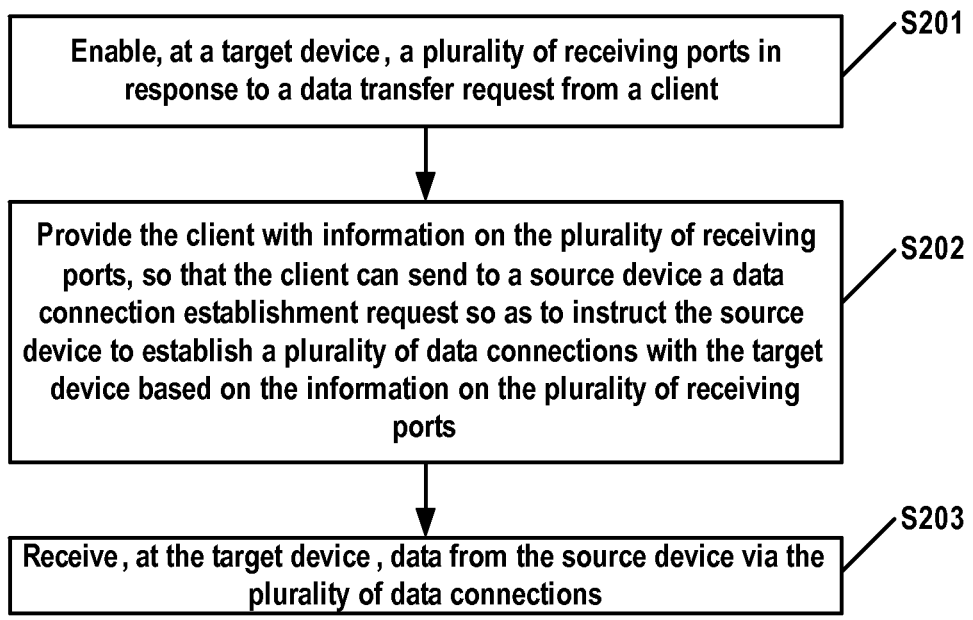
FIG. 2 schematically shows an exemplary flowchart of a data receiving method according to a second aspect of embodiments of the present disclosure.

According to a further embodiment of the present disclosure, there is provided a data receiving method as illustrated schematically in an exemplary flowchart for data receiving in FIG. 2. First, at step S201, a plurality of receiving ports are enabled at a target device in response to a data transfer request from a client. In an embodiment, the data transfer request from the client carries a number of receiving ports that are desired to be enabled. The target device may enable a proper number of receiving ports based on its own network conditions and with reference to the number of receiving ports which the client desires to enable. Then, at step S202, information on the plurality of enabled receiving ports is provided to the client, so that the client can send to a source device a data connection establishment request so as to instruct the source device to establish a plurality of data connections with the target device based on the information on the plurality of receiving ports. In an embodiment of the present disclosure, the information on the plurality of receiving ports which the target device has enabled comprises an IP address and a port number for each of the plurality of receiving ports. Next, at step S203, data are received at the target device from the source device via the plurality of data connections.

In the data receiving method as illustrated in FIG. 2, one of the source device and the target device can comprise a NAS device, and the other may comprise a backup device. The data receiving method may be implemented by the target device, so that data is backed up and restored from the source device to the target device. In an embodiment, the method is implemented based on NDMP. In the context of NDMP, considering a scenario where data is backed up from a source device to a target device by using the data receiving method as illustrated in FIG. 2, the target device is configured as a tape server supporting NDMP; and in a scenario where data is restored from a source device to a target device by using the data receiving method as illustrated in FIG. 2, the target device is configured as a data server supporting NDMP.

Figure 3:
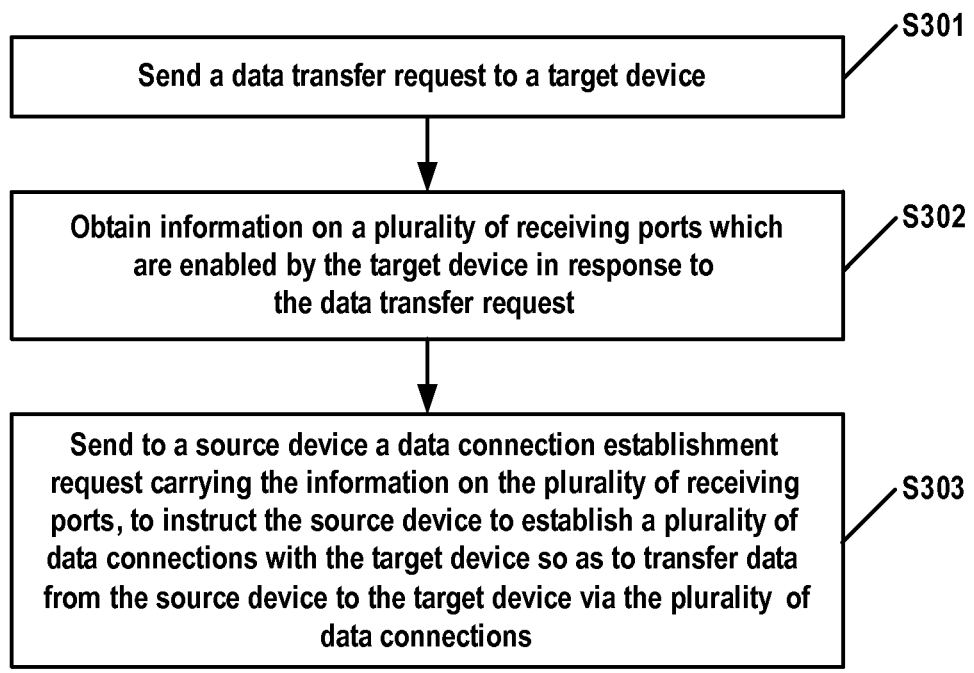
FIG. 3 schematically shows an exemplary flowchart of a data transfer method according to a third aspect of embodiments of the present disclosure.

According to a further embodiment of the present disclosure, there is provided a data transfer method as illustrated schematically in an exemplary flowchart of FIG. 3. First, at step S301, a data transfer request is sent to a target device, and in an exemplary embodiment the data transfer request carries a number of receiving ports which are desired to be enabled by the target device. Next, at step S302, information on a plurality of receiving ports is obtained, which is enabled by the target device in response to the data transfer request. In an embodiment of the present disclosure, the information on the plurality of receiving ports that have been enabled by the target device comprises an IP address and a port number for each of the plurality of receiving ports. Subsequently, at step S303, a data connection establishment request carrying the information on the plurality of receiving ports is sent to a source device to instruct the source device to establish a plurality of data connections with the target device, so as to transfer data from the source device to the target device via the plurality of data connections.

It is understood that the data transfer method as illustrated in FIG. 3 may be implemented by a client, so that data is backed up and restored from the source device to the target device. One of the source device and the target device can comprise a NAS device, and the other may comprise a backup device. In an embodiment, the method is implemented based on NDMP. In the context of NDMP, the client is implemented as Data Management Application (DMA) supporting NDMP.

Figure 4:
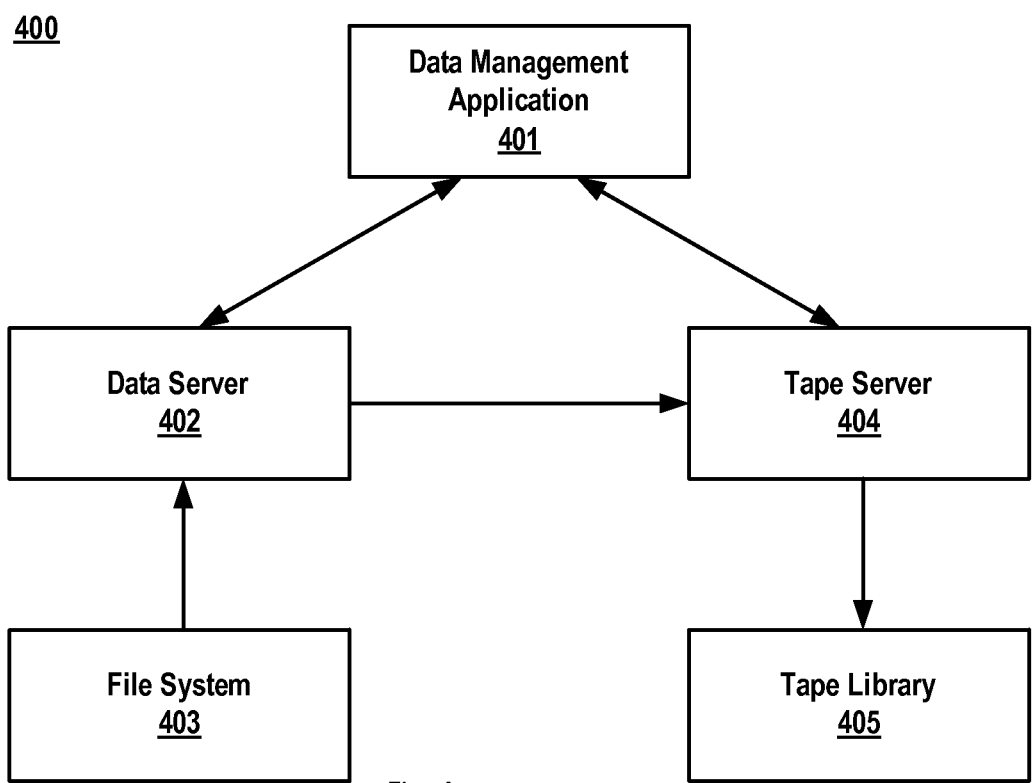
FIG. 4 schematically shows an exemplary block diagram of a system which is applicable to implement the data transfer/receiving method according to embodiments of the present disclosure.

FIG. 4 schematically shows an exemplary block diagram of a system that is configured to implement the data transfer and/or receiving method discussed previously in accordance with the embodiments of the present disclosure. With reference to FIG. 4, in the context of NDMP, the data transfer and/or receiving method according to the embodiments of the present disclosure will be described in detail by way of example in a scenario where data is backed up from a source device to a target device.

NDMP is an open standard protocol for network-based backup and restoration for NAS, and is based on a client/server model. In NDMP, Data Management Application (DMA) acts as a client to create and control NDMP sessions. DMA is responsible for reading, storing and managing all NDMP session status, server topological structures, tape settings and all operations that are needed to continue or exit sessions, such as the way of numbering, sync points and the like.

FIG. 4 illustrates an exemplary system 400 comprises a data management application 401, a data server 402, a file system 403, a tape server 404 and a tape library 405.

The data management application 401 may be configured as one or more computer program products executed on a computer (not shown), such as Networker, NetBackup, etc. The data management application 401 may communicate with data server 402 and tape server 404 based on TCP/IP protocol, for example.

The data server 402 may be configured to support NDMP. In a case where data in the file system 403 is to be backed up, the data server 402 retrieves data from the file system 403.

The tape server 404 may be configured to support NDMP. In a case where data is to be backed up from the data server 402 to the tape server 404, the tape server 404 may store data in its internal storage device such as a hard drive (not shown in the figure) or in a tape library 405 connected with the tape server 404.

When a user desires to back up data from the data server 402 to the tape server 404, the user may execute data management application 401 on a local computer (not shown in the figure) to start an NDMP backup session. Subsequently, data management application 401 establishes a connection with the tape server 404. Then, data management application 401 sends a data backup request to the tape server 404 via NDMP_MOVER_LISTEN_REQUEST message, for example. In response to the data backup request, the tape server 404 enables a plurality of receiving ports. In an embodiment, the number, for example five, of receiving ports to be enabled, may be pre-configured on the tape server 404. In response to the data backup request from the data management application 401, the tape server 404 enables the pre-configured number of receiving ports. In another embodiment, the number of receiving ports that are desired to be enabled by the tape server 404 may be carried in the data backup request (e.g. NDMP_MOVER_LISTEN_REQUEST message) sent by the data management application 401. The tape server 404 may enable a proper number of receiving ports based on its own network conditions and with reference to the desired number. For example, the number of receiving ports which are desired to be enabled by tape server 404 carried in the data backup request is five, whereas the number of receiving ports which are actually enabled by tape server 404 may be less, more than or equal to five.

Subsequently, the tape server 404 returns information on enabled receiving ports to the data management application 401 through NDMP_MOVER_LISTEN_REPLY message. The information on the enabled receiving ports may be carried by connect_addr parameter in the form of a list. The information on the enabled receiving ports may comprise an IP address, a port number, and/or other parameters for each port. When the number of receiving ports actually enabled by the tape server 404 is more than the desired number carried in the data backup request, the tape server 404 may, for example, rank the enabled receiving ports by priority in a descending order, and return to the data management application 401 the IP addresses, port numbers and corresponding priorities of the enabled receiving ports, for selection by the data management application 401 in accordance with a set of predetermined/predefined rules.

Subsequently, the data management application 401 sends a data connection establishment request to data server 402 through, for example, NDMP_DATA_CONNECT_REQUEST message. The data connection establishment request carries information of receiving ports that have been enabled by the tape server 404. The information may be carried by ndmp_addr parameter in NDMP_DATA_CONNECT_REQUEST message. In response to the data connection establishment request, the data server 402 establishes a plurality of data connections with the tape server 404 based on the information on the receiving ports which have been enabled by the tape server 404 carried in the data connection establishment request.

In an embodiment, the number (e.g. five) of data connections to be established may be pre-configured on the data server 402. In response to the data backup request from the data management application 401, the data server 402 establishes the pre-configured number of data connections with the tape server 404. In a further embodiment, the number of data connections that are desired to be established by the data server 402 may be carried in the data connection establishment request (e.g. NDMP_DATA_CONNECT_REQUEST message) sent by the data management application 401. The data server 402 may establish a proper number of data connections with the tape server 404 based on its own network conditions and with reference to the desired number. For example, the number of data connections that are desired to be established by the data server 402 and carried in the data connection establishment request is five, whereas the number of receiving ports that are actually established by the data server 402 may be five, four, three, etc.

After the data server 402 establishes the plurality of data connections with the tape server 404, the data management application 401 sends a data backup command to the data server 402 to begin data backup from the data server 402 to the tape server 404 via the plurality of parallel data connections.

Although the data transfer/receiving method according to the embodiments of the present disclosure has been described above with reference to the system as shown in FIG. 4, in the context of NDMP, and by way of example in the scenario where data is backed up from the data server 402 to the tape server 404, those skilled in the art may understand the data transfer/receiving method according to the embodiments of the present invention may also enable data restoration from the tape server 404 to the data server 402. For the system as shown in FIG. 4, it is only necessary to change the direction of data streams from the file system 403 to the tape library 405 via the data server 402 and tape server 403.

While backing up or restoring data, the data transfer/receiving method according to the embodiments of the present disclosure transfers data by using a plurality of parallel data connections from a source device to a target device, thereby enhancing the data backup or restoration speed compared to the existing solutions for transferring data by using a single data connection. In addition, in the existing solutions, once a single data connection from the source device to the target device is broken, data need to be re-transmitted. In this regard, since the data transfer/receiving method according to the embodiments of the present disclosure leverages a plurality of parallel data connections to transfer data, once any one of the plurality of data connections is broken, other data connections are still working, thereby increasing the reliability of data backup or restoration.

According to a further embodiment of the present disclosure, there is provided a data transfer apparatus. The data transfer apparatus comprises: means (hereinafter can also refer to a module, which can be a software module or a hardware module or a combination thereof) for establishing, at a source device, a plurality of data connections with a target device in response to a data connection establishment request from a client, the data connection establishment request carrying information on a plurality of receiving ports that have been enabled by the target device; and means for transferring data from the source device to the target device via the plurality of data connections.

In an exemplary embodiment, the data connection establishment request carries a number of the plurality of data connections.

In an exemplary embodiment, the information on the plurality of receiving ports comprises an IP address and a port number for each of the plurality of receiving ports.

In an embodiment, the apparatus is implemented based on NDMP.

In an exemplary embodiment, each of the plurality of data connections comprises a TCP connection.

According to a further embodiment of the present disclosure, there is provided a data receiving apparatus. The data receiving apparatus comprises: means for enabling, at a target device, a plurality of receiving ports in response to a data transfer request from a client; means for providing the client with information on the plurality of receiving ports, so that the client can send to a source device a data connection establishment request so as to instruct the source device to establish a plurality of data connections with the target device based on the information on the plurality of receiving ports; and means for receiving, at the target device, data from the source device via the plurality of data connections.

In an exemplary embodiment, the data transfer request carries a number of the plurality of receiving ports.

In an exemplary embodiment, the information on the plurality of receiving ports comprises an IP address and a port number for each of the plurality of receiving ports.

In an embodiment, the apparatus is implemented based on NDMP.

According to a further of embodiments of the present disclosure, there is provided a data transfer apparatus. The data transfer apparatus comprises: means for sending a data transfer request to a target device; means for obtaining information on a plurality of receiving ports which are enabled by the target device in response to the data transfer request; and means for sending to a source device a data connection establishment request carrying the information on the plurality of receiving ports, to instruct the source device to establish a plurality of data connections with the target device so as to transfer data from the source device to the target device via the plurality of data connections.

In an exemplary embodiment, the data transfer request carries a number of the plurality of receiving ports.

In an exemplary embodiment, the data connection establishment request carries a number of the plurality of data connections.

In an exemplary embodiment, the information on the plurality of receiving ports comprises an IP address and a port number for each of the plurality of receiving ports.

In an embodiment, the apparatus is implemented based on NDMP.

In an exemplary embodiment, each of the plurality of data connections comprises a TCP connection.

The flowchart and block diagrams in the Figures illustrate the architectures, functions, and operations which can be implemented by systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur in the order different to that noted in the figures. For example, two blocks shown in succession may, in fact, be executed substantially concurrently, or the blocks may sometimes be executed in the reverse order, depending upon the functions involved. It will also be noted that each block of the block diagrams and/or flowchart, and combinations of blocks in the block diagrams and/or flowchart, can be implemented by special purpose hardware-based systems that perform the specified functions or operations, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A data transfer method, comprising:
receiving a data connection request to transfer a portion of data from a source device to a target device, wherein the portion of data is enabled to be transferred using parallel data connections between the source device and the target device;
providing multiple ports from the source device, wherein the multiple ports are enabled to be dynamically allocated to transfer data from the source device to the target device;
establishing, at the source device, a plurality of parallel data connections with the target device in response to the data connection request from a client, the data connection request carrying information on a plurality of receiving ports enabled by the target device; and
transferring the portion of data from the source device to the target device via the plurality of parallel data connections using a network data management protocol (NDMP);
wherein each of the plurality of parallel data connections is enabled to compensate for a failure of one of the plurality of parallel data connections.

2. The method according to claim 1, wherein a number of the plurality of data connections is embedded and transmitted in the data connection request, and each of the plurality of data connections comprises a TCP connection.

3. The method according to claim 1, wherein the information on the plurality of receiving ports comprises an IP address and a port number for each of the plurality of receiving ports.

4. A data receiving method, comprising:
enabling, at a target device, a plurality of receiving ports in response to a data transfer request from a client for receiving a portion of data from a source device;
providing the client with information on the plurality of receiving ports, wherein the client is configured to send to the source device a data connection request instructing the source device to establish a plurality of parallel data connections with the target device based on the information on the plurality of receiving ports, wherein the source device is enabled to dynamically allocate multiple ports to transfer data from the source device to the target device; and
receiving, at the target device, the portion of data from the source device via the plurality of data connections using a network data management protocol (NDMP);
wherein each of the plurality of parallel data connections is enabled to compensate for a failure of one of the plurality of parallel data connections.

5. The method according to claim 4, wherein a number of the plurality of receiving ports is embedded and transmitted in the data transfer request.

6. The method according to claim 4, wherein the information on the plurality of receiving ports comprises an IP address and a port number for each of the plurality of receiving ports.

7. A data transfer method, comprising:
transmitting a data transfer request to a target device;
providing multiple ports from the source device, wherein the multiple ports are enabled to be dynamically allocated to transfer data from the source device to the target device;
obtaining information on a plurality of receiving ports enabled by the target device in response to the data transfer request for sending a portion of data from a source device to the target device; and
transmitting to the source device a data connection request wherein the data connection request include the information on the plurality of receiving ports, configured to instruct the source device to establish a plurality of parallel data connections with the target device thereby transferring the portion of data from the source device to the target device via the plurality of data connections using a network data management protocol (NDMP);
wherein each of the plurality of parallel data connections is enabled to compensate for a failure of one of the plurality of parallel data connections.

8. The method according to claim 7, wherein a number of the plurality of receiving ports is embedded and transmitted in the data transfer request.

9. The method according to claim 7, wherein a number of the plurality of data connections is carried in the data connection request, and each of the plurality of data connections comprises a TCP connection.

10. The method according to claim 7, wherein the information on the plurality of receiving ports comprises an IP address and a port number for each of the plurality of receiving ports.

* * * * *